United States Patent [19]

Gaudlitz

[11] Patent Number: 5,099,774
[45] Date of Patent: Mar. 31, 1992

[54] OIL PUMP FOR SEWING MACHINES

[75] Inventor: Robert Gaudlitz, Cary, Ill.

[73] Assignee: Union Special Corporation, Chicago, Ill.

[21] Appl. No.: 578,885

[22] Filed: Sep. 7, 1990

[51] Int. Cl.⁵ ............................................. D05B 71/00
[52] U.S. Cl. .................................. 112/256; 184/6.15; 418/15
[58] Field of Search .................... 112/256; 417/434; 418/15; 184/6.15, 7.1, 6.18, 31, 39.1

[56] References Cited

U.S. PATENT DOCUMENTS

| | | | |
|---|---|---|---|
| 2,837,173 | 6/1958 | Ciecior | 184/6.15 |
| 2,865,301 | 12/1958 | Thomas | 184/31 X |
| 3,008,438 | 11/1961 | Zeier | 112/256 |
| 3,406,788 | 10/1968 | Weisz | 112/256 |
| 3,479,961 | 11/1969 | Cadman | 418/15 |
| 3,486,474 | 12/1969 | Kosrow et al. | 184/6.15 X |
| 4,480,970 | 11/1984 | Smith | 418/15 |
| 4,522,136 | 6/1985 | Wolff et al. | 112/256 |

OTHER PUBLICATIONS

Union Special Catalog #118L third edition, 1960.

*Primary Examiner*—Werner H. Schroeder
*Assistant Examiner*—Paul C. Lewis
*Attorney, Agent, or Firm*—Morgan & Finnegan

[57] ABSTRACT

An oil pump assembly having an adjustable gear hub assembly enclosed within a housing, which assembly includes a spur gear for driving two independent gear pumps, a gear hub and an adjusting sleeve for adjusting the position of and securing the spur gear, elastically deformable oil seal rings fitting on either side of the gear hub for ensuring a tight fit of the components within the assembly and washers fitting outwardly of the oil seal rings each equipped with a "dog" for engaging the revolving spur gear. The oil pump assembly may also be provided with coverplates, one or both of which contain improved bypass channels that serve to meter the oil in the assembly so as to prevent oil leakage, while also maintaining a supply of oil in the pump assembly so as to prevent friction build up upon starting of the sewing machine.

3 Claims, 2 Drawing Sheets

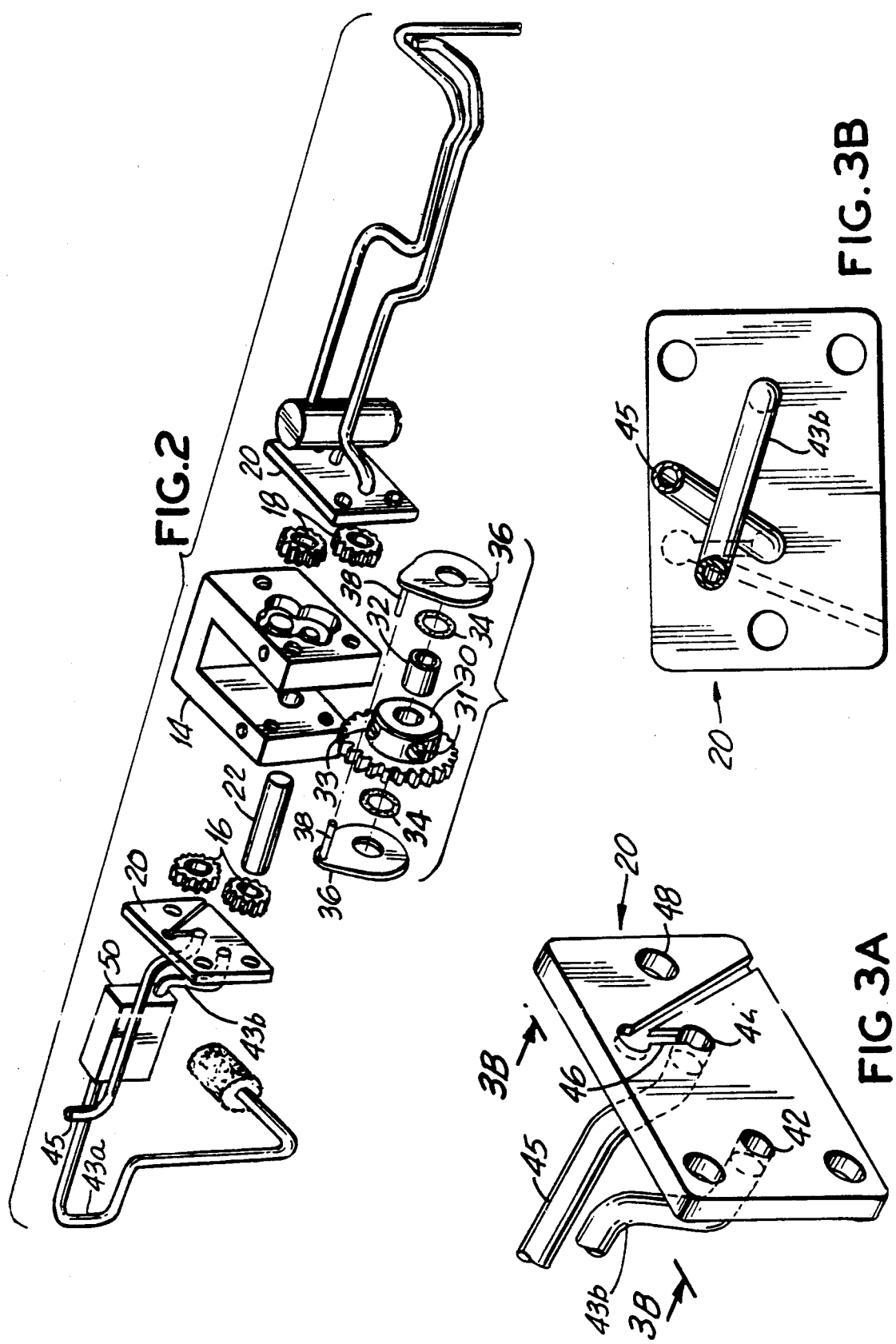

OIL PUMP FOR SEWING MACHINES

BACKGROUND OF THE INVENTION

The present invention relates to an improvement in sewing machines and more particularly to an improved oil pump for sewing machines.

Proper lubrication of moving parts is an essential feature in industrial sewing machines. For machines presently in use, lubrication may be achieved automatically by means of rotary oil pumps, which serve to continuously circulate a lubricating fluid throughout the machine. The lubricating fluid is typically straight mineral oil having a Saybolt viscosity of 90 to 125 seconds at 100 (F).

Typical of oil pump assemblies presently used for the purposes of sewing machine lubrication is that manufactured by Union Special Corporation, Chicago, Ill., in its Class 36200 machines. In such machines, space for mechanisms and adjustments is at a premium. Therefore, the oil pump assembly in such machines includes two independent gear pumps encased within one housing, both of which are driven by a common spur gear. The spur gear is attached to a gear shaft by means of a gear hub. An oil seal ring and a washer may also be included between the gear hub and the housing wall. The assembly further includes a set of coverplates on either side of the housing. These coverplates may contain a bypass channel for the purpose of metering oil to prevent oil leakage into certain areas of the machine.

A disadvantage inherent in this type oil pump assembly is that it is difficult to machine the housing and the gear hub to achieve a tight fit therebetween, which results in poor pump performance. This may be caused in large part by the difficulty in drilling the shaft hole in the housing square to the housing. If the gear shaft is not square with the housing (i.e., they do not form a right angle with each other), then instead of a tight fit between the spur gear and the inner surface of the housing, these components will meet only at a point. Such a weak seal between the spur gear and housing causes a decrease in pump effectiveness. Wear on the inner surface of the housing caused by the rotation of the components on the interior of the housing further aggravates this problem.

Upon shut-down of the sewing machine, oil may drain from the oil supply tube leading to the pump assembly through a bypass channel located in the coverplate. It is a further disadvantage to the oil pumps presently in use that the oil from the oil supply tube, as well as oil resident within the pump assembly at the time of shut-down, may be drawn out through the bypass channel, because the bypass channel is located in the same horizontal plane as the oil supply tube and the pump assembly. As a result, there is a delay in the supply of oil to the oil pump assembly upon start-up of the machine. This delay results in a build up of friction in the machine which may lead to bearing failure.

It is therefore an object of the present invention to provide an oil pump assembly having tight fitting components so as to prevent a decrease in pump effectiveness.

Another object of the present invention to provide an oil pump assembly of compact size so as to occupy minimal space within a sewing machine.

It is a further object of the present invention to provide an oil pump assembly wherein oil is retained in the oil pump during machine down time so as to minimize the delay in circulating oil to the pump upon starting of the machine.

SUMMARY OF THE INVENTION

These and other objects of the present invention are met by providing an oil pump assembly having an adjustable gear hub assembly enclosed within a housing, which assembly includes a gear hub, a spur gear attached to the gear hub for driving two independent gear pumps, elastically deformable oil seal rings located on either side of the gear hub, an adjusting sleeve and washers located outwardly of the oil seal rings each equipped with a "dog" for engaging the revolving spur gear.

The gear hub and the adjusting sleeve are provided such that they divaricate when tightened in position within the housing thereby applying a lateral force to the other components of the adjustable gear hub assembly to ensure a tight fit between such components and to ensure maintenance of pump effectiveness. The deformable oil seal rings compensate for imperfections in the machining of the components by filling gaps that would otherwise exist due in part to the gear shaft not being perfectly square to the inner surface of the housing. Further, after some time of operation, wear due to rotation of the washers relative to the inner housing walls causes a mating of the washers and the inner housing walls, thereby alleviating the problem of imperfect fit due to holes bored in the housing not being squarely drilled.

The oil pump assembly may also be provided with coverplates, one or both of which contain improved bypass channels that serve to meter the oil in the assembly so as to prevent oil leakage in other areas of the machine, while also maintaining a supply of oil in the pump assembly so as to prevent friction build up upon starting of the sewing machine.

BRIEF DESCRIPTION OF THE DRAWINGS

The invention will be described in greater detail below by way of reference to the following drawings, wherein;

FIG. 2 is a disassembled view of a gear pump assembly according to the present invention; and FIGS. 3A and 3B illustrate a coverplate of the present invention.

DETAILED DESCRIPTION OF PREFERRED EMBODIMENT

Figure 1:
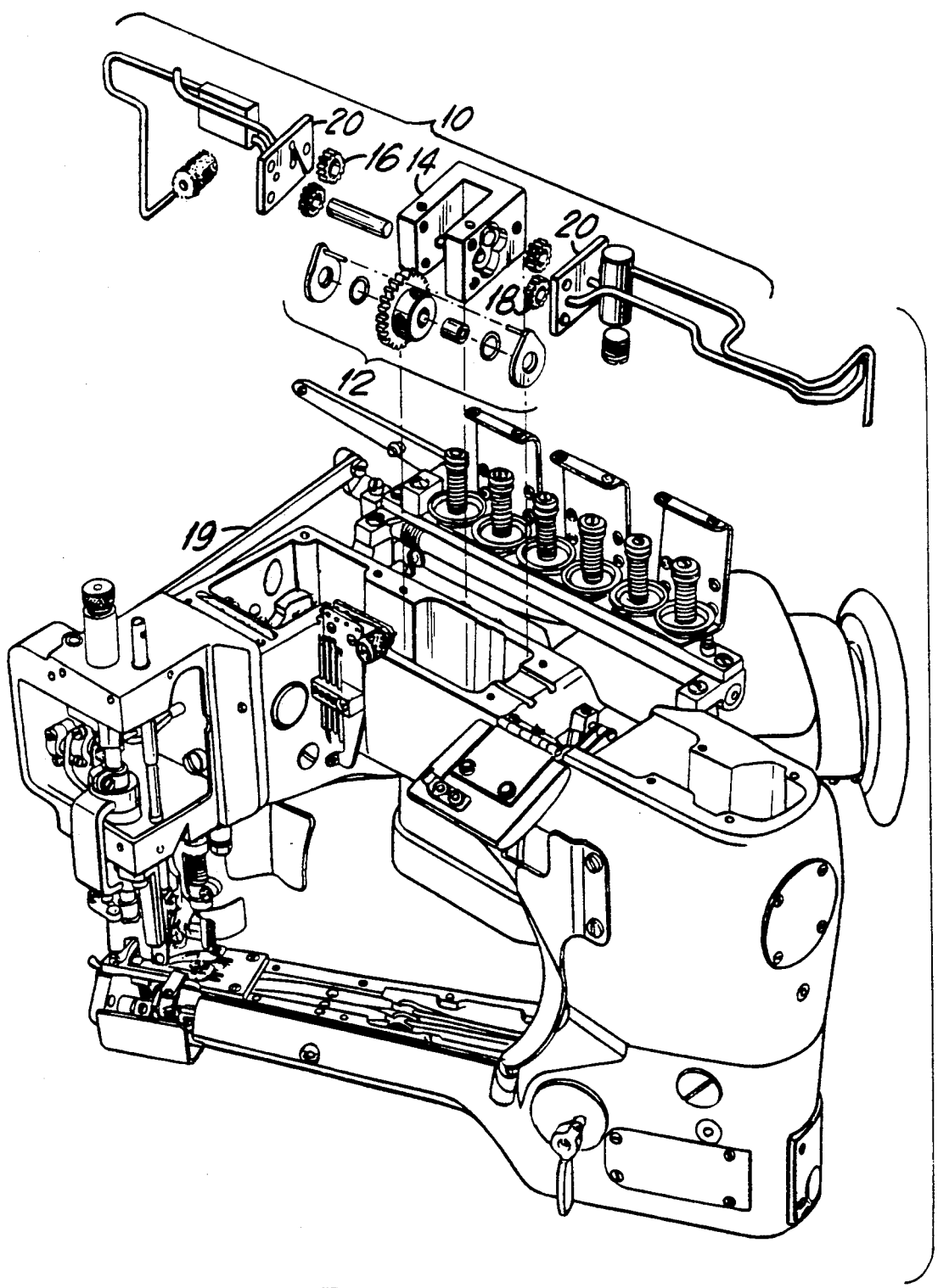
FIG. 1 is an illustration of a gear pump assembly of the present invention as it fits within a sewing machine.

An oil pump assembly according to the present invention, generally designated 10 in FIG. 1, includes an adjustable gear hub assembly 12, a housing 14, two independent gear pumps 16 and 18 and coverplates 20. The oil pump assembly 10 may be provided within the top portion of an arm 19 of a sewing machine and is covered during normal operation of the machine by a top cover (not shown).

The oil pump assembly of the present invention is shown in FIG. 1 as an adaptation to a sewing machine of the type manufactured and sold by Union Special Corporation, Chicago, Ill. as Style 36200. Such sewing machines (apart from those having the oil pump of the present invention) are well known in the art, and therefore, only those portions of the machine which are helpful to an understanding of the present invention are detailed. However, it is to be understood that the present invention may also be applied to various other types of sewing machines.

Referring to FIG. 2, the components of the adjustable gear hub assembly 12 fit tightly together when assembled so as to fit within the housing 14. The housing 14 may be horseshoe shaped, with two of the three sides parallel to each other for receiving and supporting a gear shaft 22. Fitting within the housing is a spur gear 24 driven by a main gear shaft (not shown), which spur gear 24 in turn drives the two independent gear pumps 16 and 18. The spur gear 24 is attached to a gear hub 30 capable of lateral movement along the gear shaft 22. Located adjacent the gear hub 30 is an adjusting sleeve 32. The adjusting sleeve 32 and the gear hub 30 operate to create a tight fit between the components within the housing 14 when tightened in place by a screw 31 as described below. A second screw 33 is provided to secure the gear hub 30 to the gear shaft 22. The assembly may further include a pair of elastically deformable oil seal rings 34, one located outwardly of the adjusting sleeve 32 and the other located outwardly of the spur gear 24. Adjacent to the oil seal rings 34, and in contact with the inner housing walls, are two washers 36. Each washer is equipped with an arm 38, also referred to as a "dog", which extends into and engages spur gear 24. As spur gear 24 rotates, the dogs 38 cause a corresponding rotation of the washers 36 and oil seal rings 34. Thus, these components remain stationary relative to each other and to the spur gear 24, gear hub 30 and adjusting sleeve 32.

The housing 14 and the components fitting therein are machined and installed such that each maintains a tight fit with its adjacent component. However, slight imperfections in the machining of the parts and wear in the inner surface of the housing 14 can lead to a loose fit of the components, and consequently a loss in pump performance. This problem is overcome by the present invention by providing an adjustable gear hub assembly 12 capable of adjustment to a tight fit after insertion of the components into the housing 14. When assembling the adjustable gear hub assembly 12, the spur gear 24, gear hub 30, adjusting sleeve 32, oil seal rings 34 and washers 36 are placed within the housing 14. The adjusting sleeve 32 and gear hub 30 may be provided such that the adjusting sleeve 32 fits within the gear hub 30 before screw 31 is tightened. Such a configuration provides a minimum overall width of the adjustable gear hub assembly prior to insertion to allow for easy installation of the assembly 12 into the housing 14. Once the components are fit within the housing 14, the assembly 12 may be adjusted for a tight fit by tightening screw 31, which causes a divarication of the adjusting sleeve 32 and gear hub 30 from each other along the axis of shaft 22. By spreading apart, adjusting sleeve 32 and gear hub 30 apply a lateral force to the other components of the adjustable gear hub assembly 12. When a properly tight fit is achieved, screw 33 may be tightened to secure the assembly to the gear shaft 22. The elastic oil seal rings 34 serve to fill gaps that would otherwise exist due to the gear shaft not being perfectly square to the inner surface of the housing 14.

After some time of operation, wear occurs in the inner surfaces of housing 14 due to rotation of the washers 36 relative to such surfaces. The elastic oil seal rings 34, which are compressed, will expand slightly to maintain a tight fit between the washers 36 and the inner surfaces of housing 14. Additionally, the rotation of washer 36 will "polish" the inner surfaces of housing 14 to cause a mating of the washers 36 and these surfaces, thereby further alleviating the problem of imperfect aligning of gear shaft 22 and housing 14.

The outer walls of the parallel sides of housing 14 are fit with coverplates 20 (FIG. 2). As seen in FIGS. 3A and 3B, one coverplate 20 may be fit with a hole 42 through which oil from an oil supply tube 43 is supplied to the pump assembly and a hole 44 through which oil from the pump assembly exits through an oil exit tube 45. The holes 42 and 44 lie in the same horizontal plane. Extending vertically upward on the interior face of this coverplate (i.e., the face contiguous with the housing 14), starting from hole 44, is a column 46. Extending diagonally downward from the top of column 46 is a bypass channel 48. The bypass channel 48 serves to meter the amount of oil circulating within the system, and allows runoff of excess oil that would otherwise leak from other areas of the sewing machine, possibly soiling the garment being sewn. Oil supply tube 43 may also contain an oil reservoir 50 (FIG. 2), located near the entrance to the gear pump assembly, the bottom of which lies in a higher horizontal plane than holes 42 and 44.

As seen in FIG. 2, a sewing machine of the present invention is provided with oil supply tubes 43a and 43b, which are separated by and connect with reservoir 50 at opposite walls. Supply tube 43a lies in a higher horizontal plane than supply tube 43b. During normal operation of a sewing machine, oil flows in what, for convention, may be called a positive flow direction from the oil supply tube 43b into the gear pump assembly and out oil exit tube 45, whereupon it is sprayed onto internal parts of the machine. Upon shutting down of the machine, gravity causes oil in supply tube 43a to reverse direction and exit tube 43a into a base reservoir (not shown). Thus, a siphoning action is created which siphons oil from the pump assembly, i.e., oil flows in a negative flow direction through exit tube 45, through the gear pump, through supply tube 43b, through reservoir 50 and out supply tube 43a. This is possible because exit tube 45 is open to the surrounding air, which is drawn into the area vacated by the oil. Once the siphoning force becomes sufficiently weak relative the force of gravity acting on the oil in reservoir 50, oil will once again flow in a positive flow direction from reservoir 50 into supply tube 43b, through the gear pump and will climb vertical column 46 and the vertically inclined portion of exit tube 45. When the level of oil in column 46 and exit tube 45 reaches the same horizontal plane as the oil in the reservoir 50, equilibrium is established and the flow of oil stops. In this manner, oil is left in the oil pump assembly and is available for circulation in the pump assembly without appreciable delay upon start-up of the machine.

In an alternative embodiment of the present invention, both coverplates may be configured with the improved bypass channel as described above.

Although the invention has been described in detail herein, it should be understood that the invention is not limited to the embodiments herein disclosed. Various changes, substitutions and modifications may be made thereto by those skilled in the art without departing from the spirit or scope of the invention defined by the appended claims.

I claim:
1. An oil pump for a sewing machine, comprising:
   a housing;

an adjustable gear hub assembly on an interior of said housing for driving at least one gear pump, said gear hub assembly being adjustable for a tight fit within said housing; and at least one coverplate having an interior face contiguous with an exterior surface of said housing, said interior face having a column extending vertical upward, an uppermost segment of said column connecting with a bypass channel extending diagonally downward, for removing excess oil from said oil pump, while leaving a supply of oil in said oil pump.

2. A sewing machine comprising:

an oil pump assembly having at least one coverplate with one face having a column therein extending vertically upward connecting with a bypass channel extending diagonally downward from the connection of said column to said channel;

means for removing excess oil from said oil pump assembly; and means for leaving a supply of oil in said oil pump assembly for use as a lubricant upon start-up of said sewing machine.

3. An oil pump assembly comprising:

a housing;

at least one coverplate adjacent to said housing having an interior face contiguous with said housing, said interior face having a column extending vertically upward to connect with a bypass channel extending diagonally downward from the connection of said column to said channel for the removal of excess oil from said oil pump assembly, while leaving a supply of oil in said oil pump assembly for use as a lubricant upon start-up of said sewing machine.

* * * * *